United States Patent
Safir

(10) Patent No.: US 10,472,094 B2
(45) Date of Patent: Nov. 12, 2019

(54) FLEXIBLE PASSENGER SECURITY CONTROL INSTALLATION

(71) Applicant: SELFCAIR UK LTD, Harrogate, Yorkshire (GB)

(72) Inventor: André Safir, Rueil-Malmaison (FR)

(73) Assignee: SELFCAIR UK LTD, Harrogate, Yorkshire (GB)

(*) Notice: Subject to any disclaimer, the term of this patent is extended or adjusted under 35 U.S.C. 154(b) by 0 days.

(21) Appl. No.: 16/084,540

(22) PCT Filed: Mar. 14, 2017

(86) PCT No.: PCT/EP2017/055894
§ 371 (c)(1),
(2) Date: Sep. 12, 2018

(87) PCT Pub. No.: WO2017/157878
PCT Pub. Date: Sep. 21, 2017

(65) Prior Publication Data
US 2019/0077522 A1    Mar. 14, 2019

(30) Foreign Application Priority Data
Mar. 14, 2016 (FR) ...................... 16 52141

(51) Int. Cl.
*B65G 43/08* (2006.01)
*B65G 13/11* (2006.01)
(Continued)

(52) U.S. Cl.
CPC ............... *B64F 1/368* (2013.01); *B64F 1/36* (2013.01); *B65G 13/02* (2013.01); *B65G 13/11* (2013.01);
(Continued)

(58) Field of Classification Search
CPC .................. B65G 37/00; B65G 43/08; B65G 2201/0264; G01N 23/04
(Continued)

(56) References Cited

U.S. PATENT DOCUMENTS 7,561,664 B2 * 7/2009 Teslyar .................. G01N 23/04
378/208
7,686,154 B2 * 3/2010 Henkel .................. B65G 37/02
198/347.1
(Continued)

FOREIGN PATENT DOCUMENTS

| EP | 0336362 A1 | 10/1989 |
| EP | 2868603 A1 | 5/2015 |
| WO | 2012/156552 A1 | 11/2012 |

OTHER PUBLICATIONS

International Search Reprot for PCT/EP2017/055894, dated Jun. 19, 2017.

*Primary Examiner* — James R Bidwell
(74) *Attorney, Agent, or Firm* — Merchant & Gould P.C.

(57) ABSTRACT

A passenger security control installation (10) includes a set of transfer trays and a conveying and control path (14) having a receiving end (16) and a security end (18). The installation includes a return conveying path extending beneath the tray conveying and control path (14). The installation includes a plurality of juxtaposed and mechanically independent modules (22), and each one of the modules (22) includes a U-shaped cradle part (24) that defines a cradle median plane and further includes an upper gang of motorized rollers (36) installed above a lower gang of motorized rollers (40) inside the U-shaped cradle (24), along a direction substantially perpendicular to the cradle median plane.

8 Claims, 3 Drawing Sheets

(51) Int. Cl.
*B65G 13/02* (2006.01)
*B65G 47/06* (2006.01)
*B64F 1/36* (2017.01)

(52) U.S. Cl.
CPC ............ *B65G 43/08* (2013.01); *B65G 47/06* (2013.01); *B65G 2201/0258* (2013.01)

(58) Field of Classification Search
USPC ................................................ 198/358, 580
See application file for complete search history.

(56) References Cited

U.S. PATENT DOCUMENTS

| | | | |
|---|---|---|---|
| 8,474,595 B2* | 7/2013 | Crass | B65G 37/00 198/358 |
| 8,899,404 B2* | 12/2014 | Schoepe | G01V 5/0083 198/358 |
| 2002/0125177 A1* | 9/2002 | Burns | B07C 1/02 209/630 |
| 2003/0128806 A1* | 7/2003 | Morrell | B64F 1/368 378/57 |
| 2005/0193648 A1 | 9/2005 | Klein et al. | |
| 2006/0151302 A1 | 7/2006 | Baker | |
| 2007/0029165 A1* | 2/2007 | Bender | B65G 47/648 198/358 |
| 2007/0133743 A1* | 6/2007 | Johnson | G01N 23/046 378/57 |

* cited by examiner

FLEXIBLE PASSENGER SECURITY CONTROL INSTALLATION

This application is a National Stage Application of PCT/EP2017/055894, filed Mar. 14, 2017, which claims benefit of Patent Application No. 1652141, filed Mar. 14, 2016 in France, and which applications are incorporated herein by reference. To the extent appropriate, a claim of priority is made to each of the above-disclosed applications.

BACKGROUND OF THE INVENTION

This invention relates to a passenger security control installation intended to be installed between a receiving area and a security area.

A considered field of application is especially, but not exclusively, that of security control in terminals.

Known security control installations, implemented between a receiving area and a security or boarding area, comprise a longitudinal conveyor belt and a radioscopic device that it passes through. The conveyor belt has an upstream end extending in the receiving area and a downstream end extending in the security area. Also, the installation comprises a set of transfer trays, the trays being made available to the passengers in the receiving area. In this way, successively, the passengers grasp the receiving trays and deposit them on the upstream end of the conveyor belt in order to fill them with their personal items, i.e. their luggage intended for the cabin of the aircraft and other accessories that they are carrying. Generally, each passenger uses at least two trays. Thanks to the movement of the conveyor belt, the filled trays pass through the radioscopic device and their content is controlled thanks to the X-rays, to end up finally in the downstream end, where the passengers retrieve their personal items after having crossed a control portal.

This type of installation is customised according to the configuration of the terminal. Also, it is necessary to manufacture the different elements of the installation then to transfer them in situ in order to be able to assemble them. For each new control installation, the various elements are consequently sized.

Such a method of implementation requires relatively long timeframes between the design and the installation and with this, represents relatively substantial costs.

Also, a problem that arises and which this invention aims to resolve is to provide a passenger security control installation that can be installed in shorter amounts of time and at more advantageous costs.

SUMMARY OF THE INVENTION

For this purpose, passenger security control installation intended to be installed between a receiving area and a security area of a terminal, the passengers being provided with personal items to be controlled, said installation comprising a set of transfer trays and a tray conveying and control path, said conveying and control path having a receiving end located in said receiving area in order to allow each one of said passengers to load at least one transfer tray containing their personal items to be controlled, and a security end located in said security area in order to allow each one of said passengers to retrieve their controlled personal items and to release said at least one transfer tray, said installation further comprising, a return conveying path extending beneath said tray conveying and control path in order to be able to convey the released transfer trays, from said security end to said receiving end. The installation comprises a plurality of juxtaposed and mechanically independent modules, and each one of said modules comprises, on one hand a U-shaped cradle that defines a cradle median plane, and on the other hand, an upper gang of motorised rollers installed above a lower gang of motorised rollers inside said U-shaped cradle along a direction essentially perpendicular to said cradle median plane.

As such, a characteristic of the invention resides in the production of identical modules, then in the implementing of these mechanically independent modules one after the other. Also, the modules are juxtaposed in such a way that the gangs of upper motorised rollers and the gangs of lower motorised rollers of the plurality of modules form respectively, said tray conveying and control path, and said return conveying path.

Consequently, a type of standard module is carried out that can then be stored and the number of standard modules adapted to the dimensions of the required installation is implemented. Also, substantial gains in productivity on the manufacture of the modules are in this way obtained. In addition, the storage makes it possible to respond more quickly and to reduce the timeframes for installation.

According to a particularly advantageous embodiment of the invention, said modules of said plurality of modules have identical dimensions. They are as such easy to produce at an advantageous cost, and the storage is also facilitated.

Preferably, the gang of motorised rollers each have a motor roller and driven rollers coupled in rotation to said motor roller. As such, the motorised rollers extend parallel to one another in the same plane, and one of them is a motor roller, for example of the tubular type. It is then coupled to the other rollers for example by means of a transmission belt.

It will be observed that the motorised rollers extend along directions that are parallel to the cradle median plane.

In addition, the gangs of motorised rollers each have, advantageously, a pair of parallel support members, and said motorised rollers are transversally mounted between the support members of said pair of support members. Also, the parallel support members extend perpendicularly to the cradle median plane and they are provided with facing bearings, and the motorised rollers each have two opposite ends. The two opposite ends are then respectively installed in two facing bearings.

Advantageously, said U-shaped cradle has two opposite branches and a base in order to maintain said branches essentially vertically. In this way, the U-shaped cradle, forming the framework of the module, extends vertically over a horizontal wall, and in particular the ground wall. It is observed that the median plane of the U-shaped cradle is oriented essentially perpendicularly to the longitudinal direction of driving of the transfer trays, from the receiving end to the security end.

Furthermore, said upper gang of motorised rollers has motorised rollers spaced apart from one another, and said upper gang of motorised rollers of one of said modules comprises transversal conveying members mounted between said motorised rollers. In this way, from a standard module that is identical to the other modules, transversal conveying members are added thereto that make it possible to drive the transfer trays in translation along a direction perpendicular to the longitudinal direction of driving of the transfer trays. Such a possibility of diverting of the transfer trays makes it possible to isolate for example, transfer trays containing suspicious personal items.

Preferably, said transversal conveying members each comprise a frame mounted mobile in translation between a retracted position and a protruding position of said motorised rollers, and a transfer belt mounted mobile in rotation around said frame. Also, the driving members comprise a vertical actuator in order to support the protruding frame of the motorised rollers, and a rotating actuator in order to be able to drive the belt in rotation.

According to another embodiment of the invention, the installation further comprises a terminal module, comprising on one hand a U-shaped cradle, and on the other hand an upper storage space for receiving said released transfer trays, located above a lower gang of motorised rollers inside said U-shaped cradle, and said terminal module comprises gear wheels in order to be able to drive one by one said released transfer trays on said lower gang of motorised rollers. As such, the terminal module is located at the end of said security end in the extension of said plurality of juxtaposed modules. In this way, using the framework of the module, a terminal module is produced that makes it possible to support the released trays on the upper gang of motorised rollers to the return conveying path. The released transfer trays are indeed stacked on one another on the gear wheels. And the step-by-step rotation of the gear wheels makes it possible to deposit the released transfer trays one-by-one on the lower gang of motorised rollers, which is contiguous to the lower gang of motorised rollers of the last module preceding the terminal module.

It is observed that the rollers of the upper gang of motorised rollers of all of the modules, forming the conveying and control path, are driven in one same direction of rotation making it possible to drive the transfer trays pressing on these rollers, from the receiving end to the security end. In contrast, the rollers of the lower gang of motorised rollers of all of the modules, forming the return conveying path, are driven in an opposite direction of rotation in order to be able to drive the transfer trays pressed against these rollers from the security end to the receiving end.

Furthermore, particularly advantageously, said modules are connected together by a computer bus. In this way, the simultaneous control of all of the modules is simplified. In addition, the cabling time of the conventional installations is as such avoided.

BRIEF DESCRIPTION OF THE DRAWINGS

Other particularities and advantages of the invention shall appear upon reading the description given hereinafter of a particular embodiment of the invention, provided for the purposes of information but in no way limiting, in reference to the appended drawings wherein.

Figure 5:
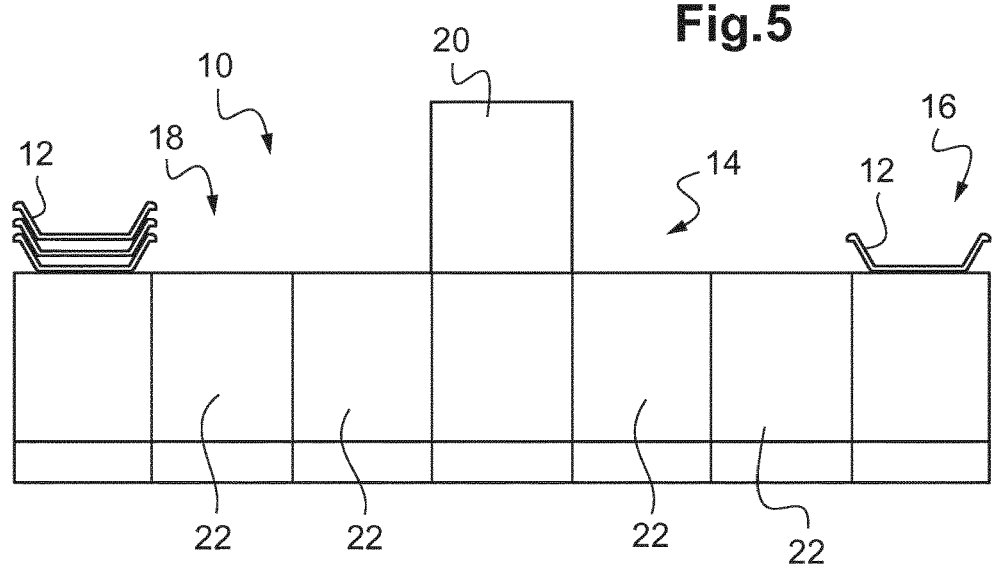

Reference is first made to FIG. 5 showing a passenger security control installation 10 in accordance with the invention. The control installation 10 has a set of transfer trays 12 and a conveying and control path 14 of the transfer trays 12. The conveying and control path 14 has a receiving end 16 and an opposite security end 18. An X-ray control device 20 is installed between the two ends 16, 18. The passengers as such fill the transfer trays 12 with their personal items at the receiving end 16. The transfer trays are conveyed on the conveying and control path 14 in order to pass through the X-ray control device, then are guided to the security end 18. The passengers then retrieve their personal items and store the released transfer trays 12 at the security end 18 as shall be explained hereinafter.

Also, the control installation 10 has juxtaposed modules 22 that are identical in terms of dimensions, framework and construction.

Figure 1:
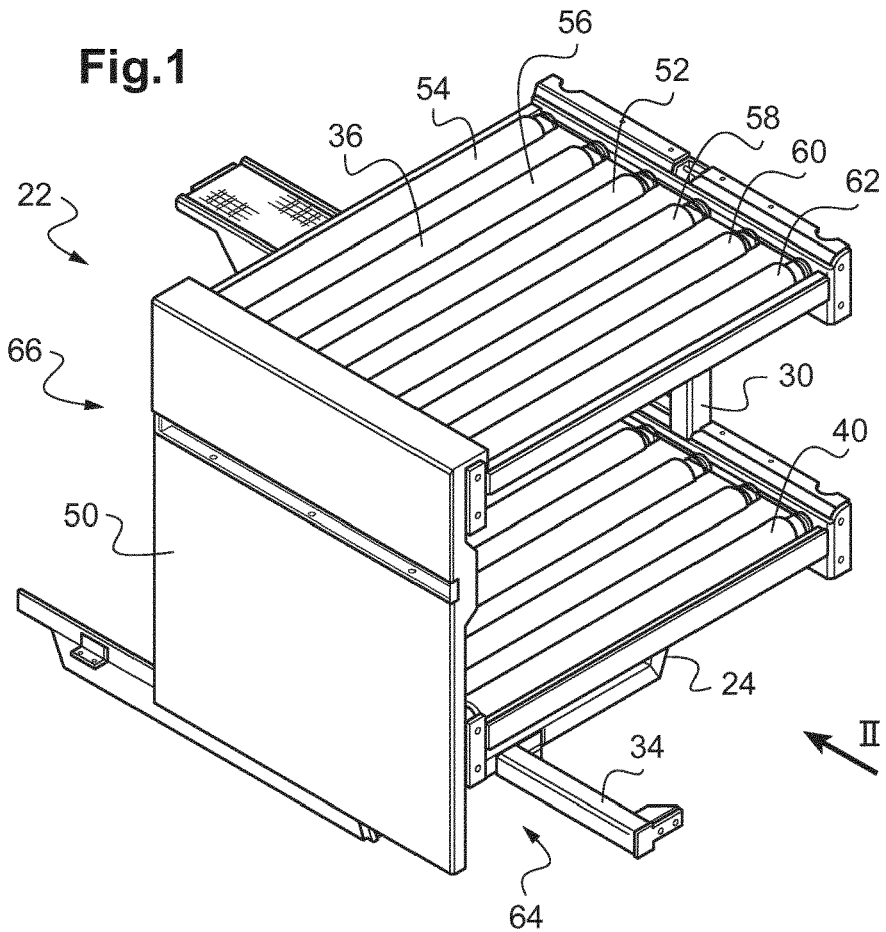
FIG. 1 is a partial schematic, perspective view of a module in accordance with the invention.
Figure 2:
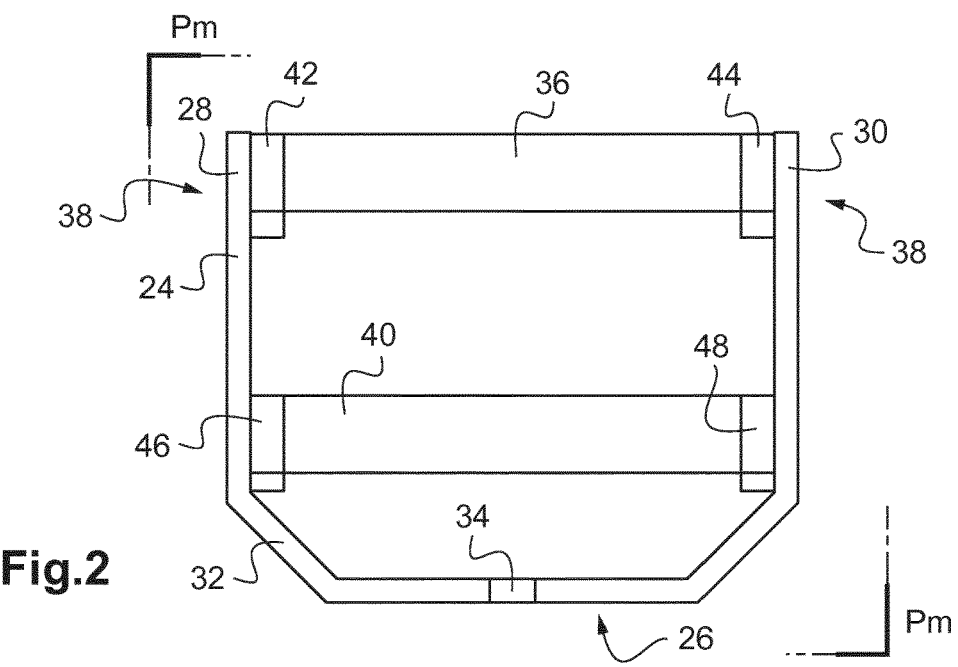
FIG. 2 is a partial front schematic view of an element of the invention shown in FIG. 1 according to the arrow II.

A basic module 22 shall as such be described in reference to FIGS. 1 and 2. As such, FIG. 2 shows a U-shaped cradle 24 extending along a median plane Pm parallel to the plane of the figure and has a base 26 and two parallel branches 28, 30 opposite one another. The base 26 comprises a V-shaped portion 32 connecting between them the two branches, 28, 30 and a longitudinal profile 34 extending perpendicularly to the V-shaped portion 32 in such a way as to be able to maintain the two branches 28, 30 vertically with respect to a ground wall.

Furthermore, an upper gang of motorised rollers 36 is installed between the two branches 28, 30 on their free end 38. The upper gang of motorised rollers 36 comprises two upper parallel support members 42, 44 respectively integral with the two branches 28, 30.

A lower gang of motorised rollers 40 is installed below the upper gang of motorised rollers 36 in parallel. The lower gang of motorised rollers 40 comprises two lower parallel support members 46, 48 respectively integral with the two branches 28, 30.

As such, FIG. 1 shows the upper gang of motorised rollers 36 located above the lower gang of motorised rollers 40. There is one branch 30 shown of the two branches 28, 30 of the cradle 24. The second branch 28 is itself masked by a lining wall 50.

DETAILED DESCRIPTION OF THE PREFERRED EMBODIMENTS

It is observed that the upper gang of motorised rollers 36 is similar here to the lower gang of motorised rollers 40. Also, the upper gang of motorised rollers 36 has six parallel rollers spaced apart from one another, one motor roller 52 and five motorised rollers 54, 56, 58, 60, 62. The motor roller 52 is coupled in rotation to the other rollers 54, 56, 58, 60, 62 by means of a transmission belt not shown. The motor roller 52 is driven itself by a tubular motor housed inside and it as such drives the other rollers in a predefined direction of rotation.

In the same way, the lower gang of motorised rollers 40 has six parallel rollers spaced apart from one another with one motor roller in order to be able to drive the five other motorised rollers. On the other hand, the motor roller of the lower gang of motorised rollers 40 drives the rollers in a direction of rotation opposite the predefined direction of rotation of the motorised rollers of the upper gang 36.

Moreover, it is observed that the module 22 has an upstream interface 64 opposite a downstream interface 66 and that a computer communication bus extends between the upstream interface 64 and the downstream interface 66 and that the communication bus is connected to the control elements of the motor rollers. Moreover, a parallel electrical power supply is provided.

Figure 3:
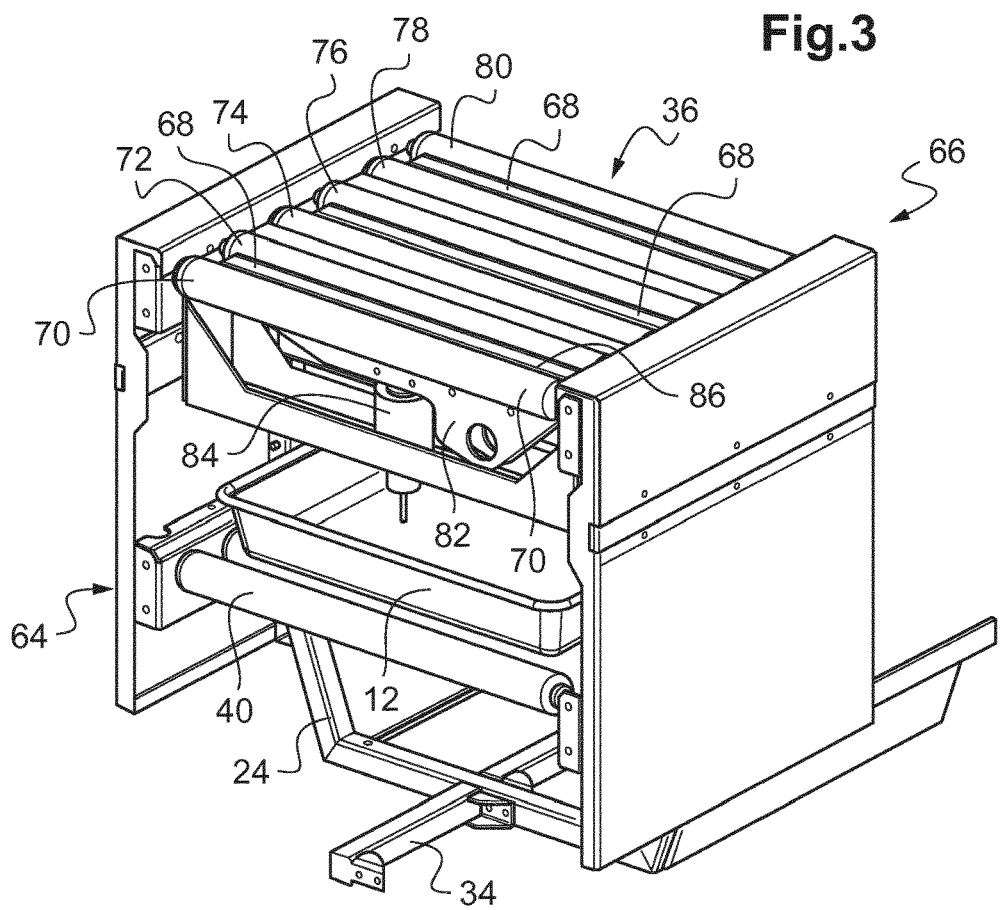
FIG. 3 is a partial schematic, perspective view of a module in accordance with the invention provided with an additional element.

Reference shall now be made to FIG. 3 showing a module such as shown in FIG. 1, further including transversal conveying members 68. The U-shaped cradle 24 and the two upper 36 and lower 40 gangs of motorised rollers can be seen in this figure. It is observed that the upper gang of motorised rollers 36 has six motorised rollers, from the upstream interface 64 to the downstream interface 66, a first pair of rollers 70, 72 spaced apart from one another, a second pair of rollers 74, 76, spaced apart from one another, and a third pair of rollers 78, 80 also spaced apart from one another. Each one of the pairs has between its rollers, transversal conveying members 68.

Each transversal driving member 68 comprises a vertically mobile frame 82 and a vertical actuator 84. And each mobile frame is provided with a belt 86 mounted in rotation around the frame. It is moved in rotation by a motor member not shown. As such, the vertical actuator 84 is intended to drive in translation the mobile frame protruding from the plane of the rollers while the motor member causes the rotation of the belt 86 in order to transfer the transfer tray along a perpendicular direction. The three transversal conveying members 68 are coupled with one another in order to be able to be controlled simultaneously.

Figure 4A:
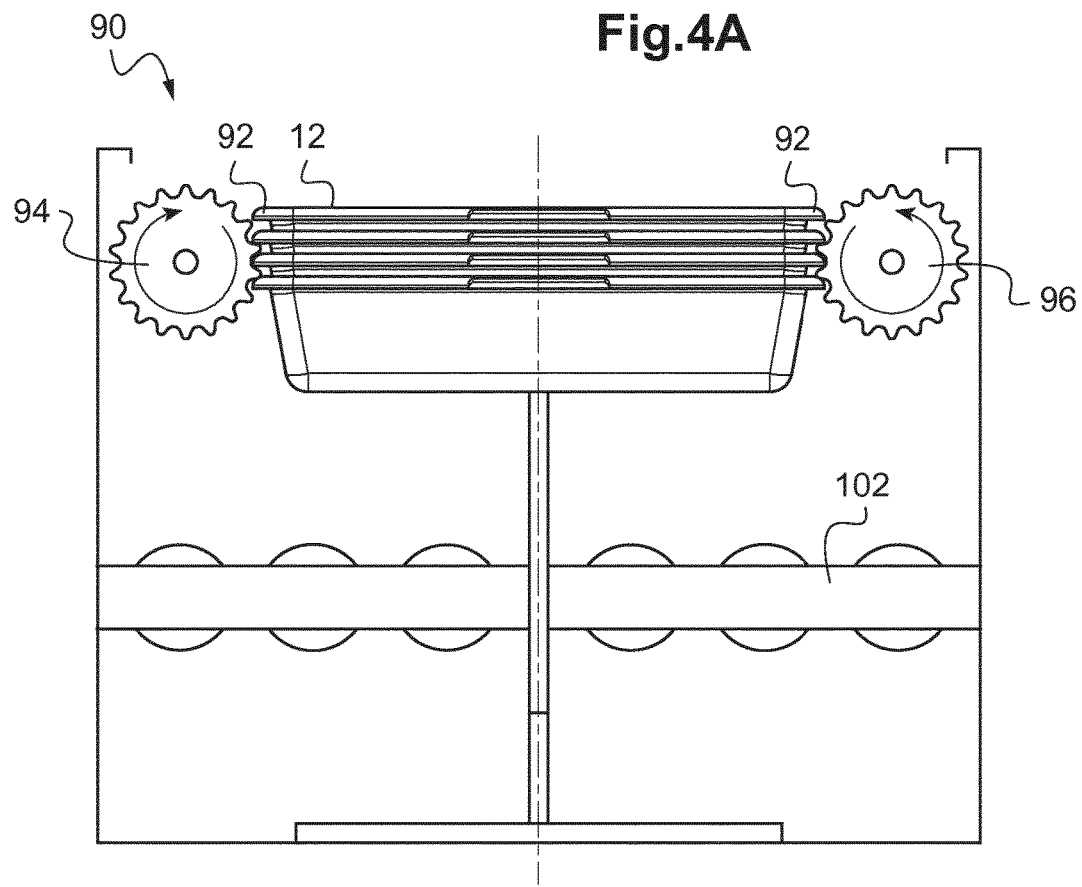
FIG. 4A is a partial schematic view of the side of an additional module in accordance with the invention.
Figure 4B:
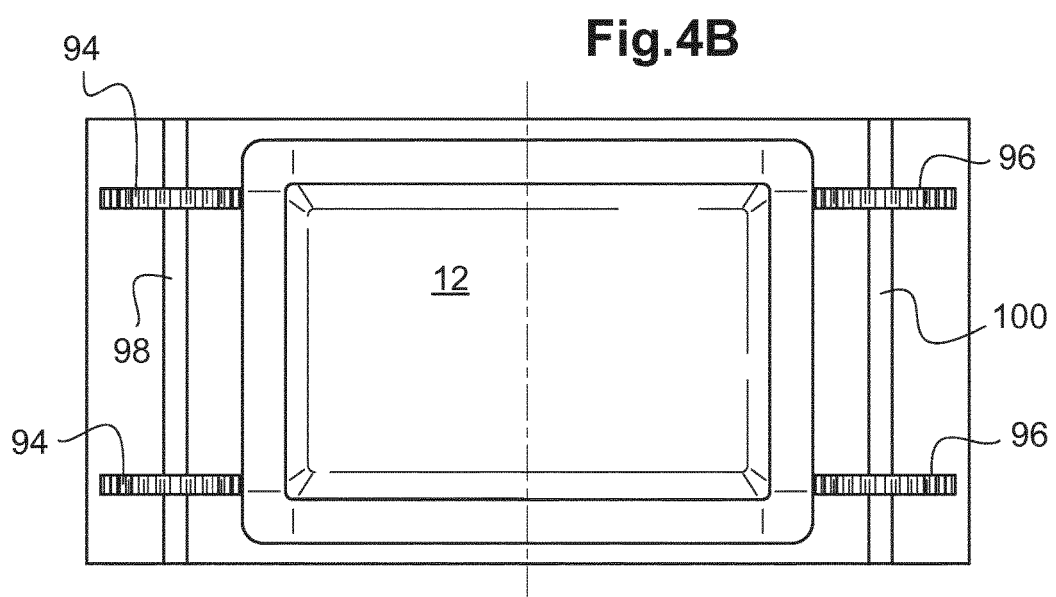
FIG. 4B is a partial schematic view of the top of the additional module shown in FIG. 4A; and, FIG. 5 is a partial schematic view of the side of a control installation in accordance with the invention.

Reference shall now be made to FIGS. 4A and 4B, showing a terminal module 90. The latter comprises a framework similar to that of the module 22 shown in FIG. 2, except for the upper portion, wherein the upper gang of motorised rollers 36 is replaced with an upper storage space of the released transfer trays 12. The transfer trays 12 have a general tapered shape and an edge 92. As such, they can be stacked into one another while the edges 92 of the stacked trays define a cylindrical envelope.

As such, on either side of the upper storage space, two pairs of gear wheels 94, 96 are installed respectively on two parallel shafts 98, 100. Also, in their periphery that is closest to one another, the facing gear wheels 94, 96 have two tooth gullets able to receive the two opposite edges of a transfer tray 12. Also, the transfer tray 12 is imprisoned by the two teeth and all of the transfer trays 12 engaged above are stored and remain in a fixed position.

The facing gear wheels 94, 96 are then driven in rotation towards one another, step-by-step. With this, the stacked transfer trays 12 are released one-by-one and they end up on a lower gang of motorised rollers 102. In this way, the transfer tray 12 pressing on this lower gang of motorised rollers 102 will be able to be transferred to the contiguous module 22 of the type shown in FIG. 1, in order to be able to return to the receiving end thanks to the return conveying path defined by the lower gangs of motorised rollers 40 of the juxtaposed modules.

The invention claimed is:

1. A passenger security control installation installed between a receiving area and a security area of a terminal, passengers being provided with personal items to be controlled, said installation comprising:
   a set of transfer trays and a conveying and control path of the transfer trays, said conveying and control path having a receiving end located in said receiving area to allow each one of said passengers to load at least one transfer tray containing the personal items to be controlled, and a security end located in said security area to allow each one of said passengers to retrieve the controlled personal items and to release said at least one transfer tray;
   a return conveying path extending beneath said tray conveying and control path to convey the released transfer trays, from said security end to said receiving end;
   a plurality of juxtaposed and mechanically independent modules, each one of said modules comprising a U-shaped cradle in a plane perpendicular to said conveying and control paths, and an upper gang of motorised rollers installed above a lower gang of motorised rollers inside said U-shaped cradle along a direction parallel to said conveying and control paths;
   wherein the upper gang of motorised rollers and the lower gang of motorised rollers each have a pair of parallel horizontal support members supported on the U-shaped cradle and extending parallel to said conveying and control paths, and wherein said motorised rollers are transversally mounted between the support members of said pair of support members.

2. Security control installation according to claim 1, wherein said modules of said plurality of modules have identical dimensions.

3. Security control installation according to claim 1, wherein the gang of motorised rollers each have a motor roller and driven rollers coupled in rotation to said motor roller.

4. Security control installation according to claim 1, wherein said modules are connected together by a computer bus.

5. Security control installation according to claim 1, wherein said U-shaped cradle has two opposite vertically extending branches and a horizontal base to maintain said branches substantially vertically.

6. A passenger security control installation installed between a receiving area and a security area of a terminal, passengers being provided with personal items to be controlled, said installation comprising:
   a set of transfer trays and a conveying and control path of the transfer trays, said conveying and control path having a receiving end located in said receiving area to allow each one of said passengers to load at least one transfer tray containing the personal items to be controlled, and a security end located in said security area to allow each one of said passengers to retrieve the controlled personal items and to release said at least one transfer tray;
   a return conveying path extending beneath said tray conveying and control path to convey the released transfer trays, from said security end to said receiving end;
   a plurality of juxtaposed and mechanically independent modules, each one of said modules comprising a U-shaped cradle in a plane perpendicular to said conveying and control paths, and an upper gang of motorised rollers installed above a lower gang of motorised rollers inside said U-shaped cradle along a direction parallel to said conveying and control paths;
   wherein said upper gang of motorised rollers has motorised rollers spaced apart from one another, and wherein said upper gang of motorised rollers of one of said modules comprises transversal conveying members mounted between said motorised rollers.

7. Security control installation according to claim 6, wherein said transversal conveying members each comprise a frame mounted mobile in translation between a retracted position and a protruding position of said motorised rollers, and a transfer belt mounted mobile in rotation around said frame.

8. A passenger security control installation installed between a receiving area and a security area of a terminal, passengers being provided with personal items to be controlled, said installation comprising:

a set of transfer trays and a conveying and control path of the transfer trays, said conveying and control path having a receiving end located in said receiving area to allow each one of said passengers to load at least one transfer tray containing the personal items to be controlled, and a security end located in said security area to allow each one of said passengers to retrieve the controlled personal items and to release said at least one transfer tray;

a return conveying path extending beneath said tray conveying and control path to convey the released transfer trays, from said security end to said receiving end;

a plurality of juxtaposed and mechanically independent modules, each one of said modules comprising a U-shaped cradle in a plane perpendicular to said conveying and control paths, and an upper gang of motorised rollers installed above a lower gang of motorised rollers inside said U-shaped cradle along a direction parallel to said conveying and control paths;

a terminal module, comprising a U-shaped cradle, and an upper storage space to receive said released transfer trays, located above a lower gang of motorised rollers inside said U-shaped cradle, and wherein said terminal module comprises gear wheels to drive one by one the released transfer trays on said lower gang of motorised rollers.

\* \* \* \* \*